(12) United States Patent
Chiew et al.

(10) Patent No.: US 8,200,378 B1
(45) Date of Patent: Jun. 12, 2012

(54) SYSTEM, MODULE, AND METHOD FOR PRESENTING NOTAM INFORMATION ON AN AIRCRAFT DISPLAY UNIT

(75) Inventors: Daniel Y. Chiew, Marion, IA (US); David A. Frank, North Liberty, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 472 days.

(21) Appl. No.: 12/569,919

(22) Filed: Sep. 30, 2009

(51) Int. Cl.
*G05D 1/06* (2006.01)

(52) U.S. Cl. ............... 701/4; 701/15; 701/16; 701/408; 701/468

(58) Field of Classification Search .............. 701/2, 4, 701/10, 14, 15, 16, 17, 408, 409, 428, 448, 701/461, 468; 340/965, 945, 963, 967, 974, 340/975
See application file for complete search history.

(56) References Cited

U.S. PATENT DOCUMENTS

| | | | |
|---|---|---|---|
| 6,122,570 A * | 9/2000 | Muller et al. | 701/9 |
| 7,098,810 B2 * | 8/2006 | Bateman et al. | 340/963 |
| 2010/0333040 A1 * | 12/2010 | Palanisamy et al. | 715/854 |

OTHER PUBLICATIONS

"NOTAM Data Model"; Oct. 10-11, 2007; Slide Presentation of AIXM Class 2007 (AIXM 5.0 RC2); Eurocontrol and Federal Aviation Administration; Washington D.C.
"Digital NOTAM Examples"; Mar. 18-20, 2008; Slide Presentation of AIXM User Conference 2008; Eurocontrol and Federal Aviation Administration; Washington D.C.
U.S. Appl. No. 11/820,950, filed Jun. 21, 2007, Krenz et al.
U.S. Appl. No. 12/069,234, filed Feb. 8, 2008, Wichgers et al.
U.S. Appl. No. 12/069,319, filed Feb. 8, 2008, Wichgers.
U.S. Appl. No. 12/217,458, filed Jul. 3, 2008, Chiew et al.

* cited by examiner

*Primary Examiner* — Richard M. Camby
(74) *Attorney, Agent, or Firm* — Donna P. Suchy; Daniel M. Barbieri

(57) ABSTRACT

A present novel and non-trivial system, module, and method for presenting NOTAM information are disclosed. A plurality of sources may be used for providing navigation data, terrain data, NOTAM data, and object data. After receiving this data, a NOTAM display generating processor may generate a NOTAM image data set as a function of the navigation data, terrain data, NOTAM data, and object data. The NOTAM image data set may be representative of NOTAM information presented in a three-dimensional perspective of a scene outside an aircraft, where NOTAM information may comprise non-textual NOTAM information, textual NOTAM information, or both. After being generated, the NOTAM image data set may be provided to a presentation system where NOTAM information may be presented on at least one tactical display unit such as a head-down display unit and/or a head-up display unit.

24 Claims, 6 Drawing Sheets

!ABC ABC RWY 2R/20L CLSD WEF 0908171300-0908231700

FIG. 2A

!ABC XYZ NAV VOR OTS WEF 0908171600

FIG. 2B

!ABC ABC OBST CRANE 195 (125 AGL) .75 SW TIL 0908232000

FIG. 2C

SYSTEM, MODULE, AND METHOD FOR PRESENTING NOTAM INFORMATION ON AN AIRCRAFT DISPLAY UNIT

BACKGROUND OF THE INVENTION

1. Field of the Invention

This invention pertains generally to the field of display units that provide flight and/or ground information to the pilot or flight crew of an aircraft.

2. Description of the Related Art

Time-critical aeronautical information, which is of either a temporary nature or not sufficiently known in advance to permit publication on aeronautical charts or in other operational publications, receives immediate dissemination via a Notice to Airmen ("NOTAM") System. NOTAMs may be provided to the pilot during a standard briefing. NOTAMs may comprise a notice containing information concerning the establishment, condition, or change in any aeronautical facility, service, procedure or hazard, the timely knowledge of which is essential to personnel concerned with such operations. NOTAMs may be issued and/or reported by national authorities for a number of reasons, such as: hazards such as airshows, parachute jumps, and glider or micro light flying; flights by important people such as heads of state; closed runways, taxiways, etc.; unserviceable radio navigational aids; military exercises with resulting airspace restrictions; unserviceable lights on tall obstructions; and temporary erection of obstacles near airfields (e.g., cranes).

NOTAM information may be disseminated for all navigational facilities that are part of a national airspace system, all public use airports, seaplane bases, and heliports. NOTAMs may include information related to taxiway closures, personnel and equipment near or crossing runways, and airport lighting aids that do not affect instrument approach criteria such as a visual slope indicator. NOTAMs may include amendments to published instrument approach procedures and other current aeronautical charts. NOTAMs may publish a temporary flight restriction imposed in order to protect persons and property in the aircraft or on the surface from an existing or imminent flight associated hazard, provide a safe environment for the operation of disaster relief aircraft, prevent an unsafe congestion of sightseeing aircraft above an incident, protect the President, Vice-President, or other public figures, and provide a safe environment for space agency operations.

NOTAM information may be distributed by means of telecommunication containing information essential to personnel concerned with flight information. Recently, efforts have been taken to digitize the dissemination of NOTAM information by, for example, making a data set available through digital services containing information to systems and automated equipment by personnel concerned with flight operations. With the development of digital data sets, there is a need for generating and presenting NOTAM information directly in front of a pilot on a tactical display unit.

BRIEF SUMMARY OF THE INVENTION

The embodiments disclosed herein present at least one novel and non-trivial system, module, and method for generating and presenting NOTAM information to the pilot or air crew. The use of visual information may be used to enhance a pilot's situational awareness of an object affected by the NOTAM.

In one embodiment, a system is disclosed for presenting NOTAM information to a pilot. The system may comprise sources for navigation data, terrain data, NOTAM data, and object data; a NOTAM display generating ("NDG") processor; and a presentation system. After receiving of this data, an NDG processor may generate a NOTAM image data set as a function of the received data. The NOTAM image data set may be representative of NOTAM information presented in a three-dimensional perspective of a scene outside the aircraft, and the NOTAM information may be comprised of non-textual NOTAM information, textual NOTAM information, or both. After generation of the NOTAM image data set, such data set may be provided to a presentation system where NOTAM information may be presented on at least one display unit. As embodied herein, a display unit could include a tactical display unit such as a head-down display ("HDD") unit and/or a head-up display ("HUD") unit.

In another embodiment, a module is disclosed for presenting NOTAM information to a pilot. The module may comprise an input communications interface, an NDG processor, and an output communications interface. An NDG processor may receive navigation data, terrain data, NOTAM data, and object data. Then, an NDG processor generates a NOTAM image data set as a function of the received data. The NOTAM image data set may be representative of NOTAM information presented in a three-dimensional perspective of a scene outside the aircraft, and the NOTAM information may be comprised of non-textual NOTAM information, textual NOTAM information, or both. Then, the NOTAM image data set may be provided to a presentation system, where NOTAM information may be presented on at least one tactical display unit. A module could be, but is not limited to, a printed circuit board (either in whole or in part) installed in a line replaceable unit in an aircraft.

In another embodiment, a method is disclosed for presenting NOTAM information to a pilot. The method may comprise receiving navigation data, terrain data, NOTAM data, and object data. Then, a NOTAM image data set may be generated as a function of the received data. The NOTAM image data set may be representative of NOTAM information presented in a three-dimensional perspective of a scene outside the aircraft, and the NOTAM information may be comprised of non-textual NOTAM information, textual NOTAM information, or both. Then, the NOTAM image data set may be provided to a presentation system, where NOTAM information may be presented on at least one tactical display unit.

The drawings of FIG. 2 provide illustrative examples of NOTAMs.

Figure 3A:
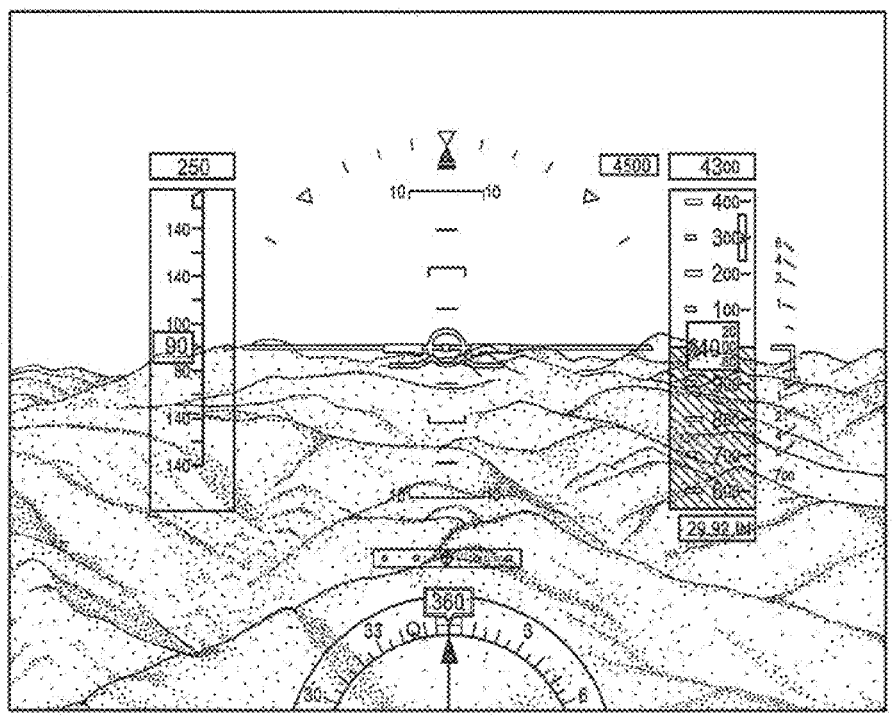

FIG. 3A depicts an exemplary illustration of an image on an HDD display unit depicting a scene outside the aircraft with symbology providing tactical flight information.

Figure 3B:
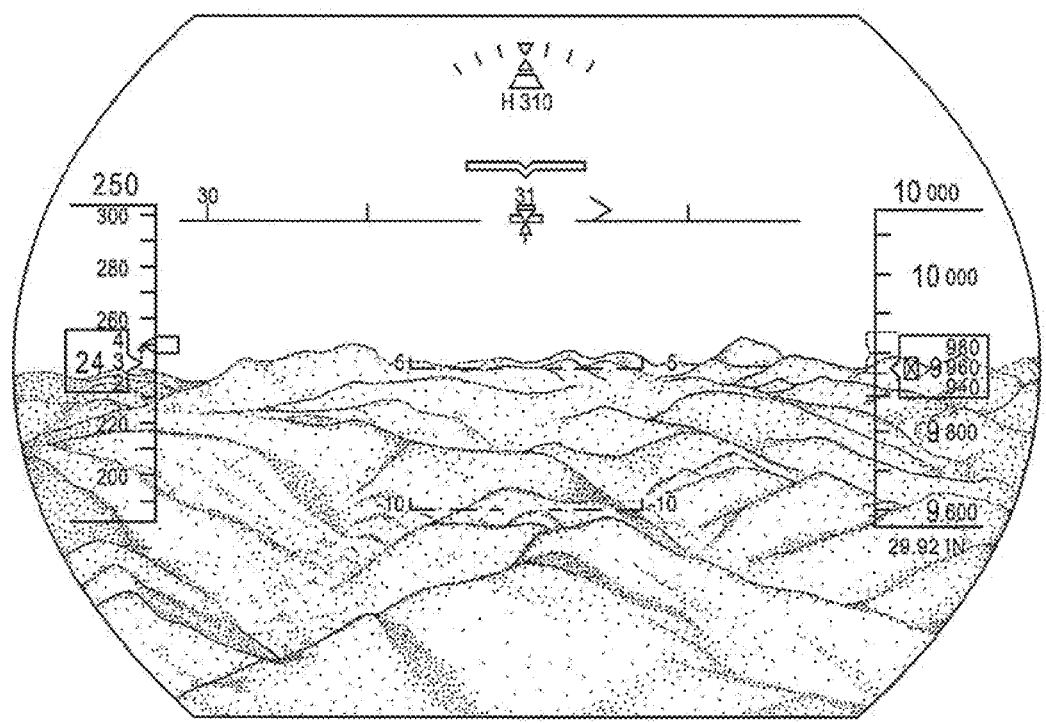

FIG. 3B depicts an exemplary illustration of an image on a HUD display unit depicting a scene outside the aircraft with symbology providing tactical flight information.

Figure 4A:
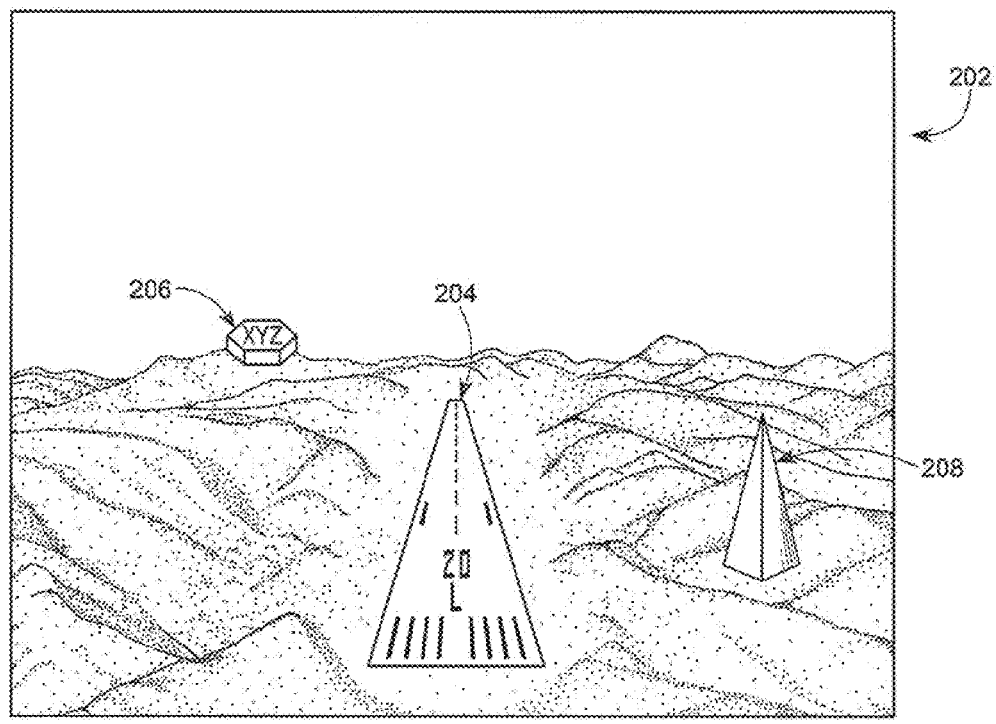

FIG. 4A depicts an exemplary illustration of an image on a display unit depicting a scene outside the aircraft with a runway, navigation aid, and obstruction/object.

Figure 4B:
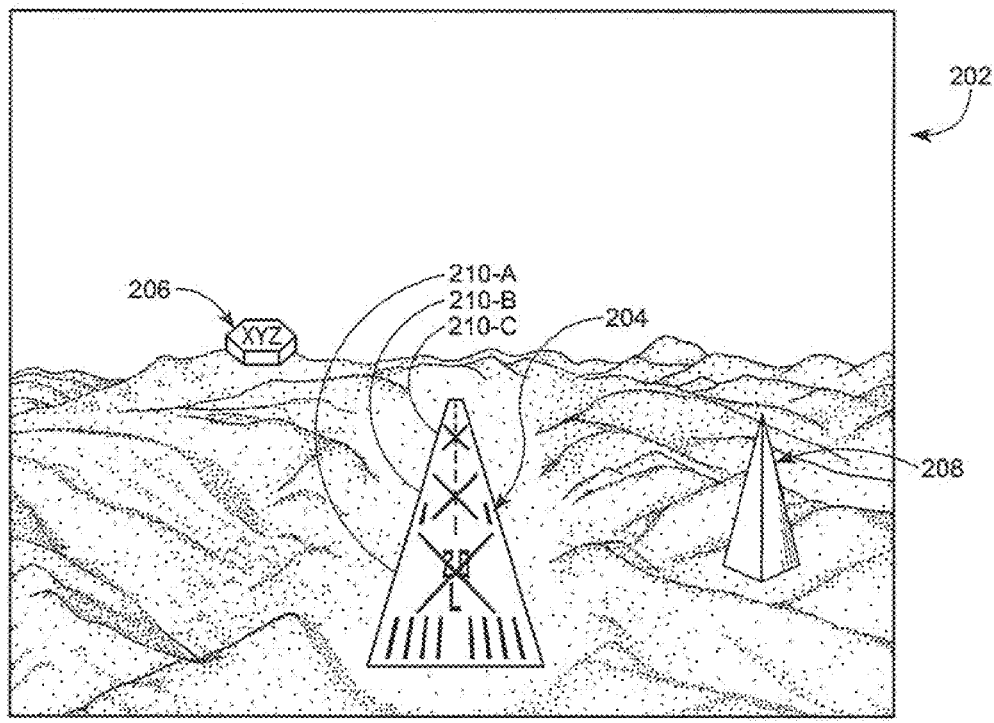

FIG. 4B depicts the same scene as FIG. 4A but includes non-textual NOTAM information of a NOTAM affecting a runway.

Figure 4C:
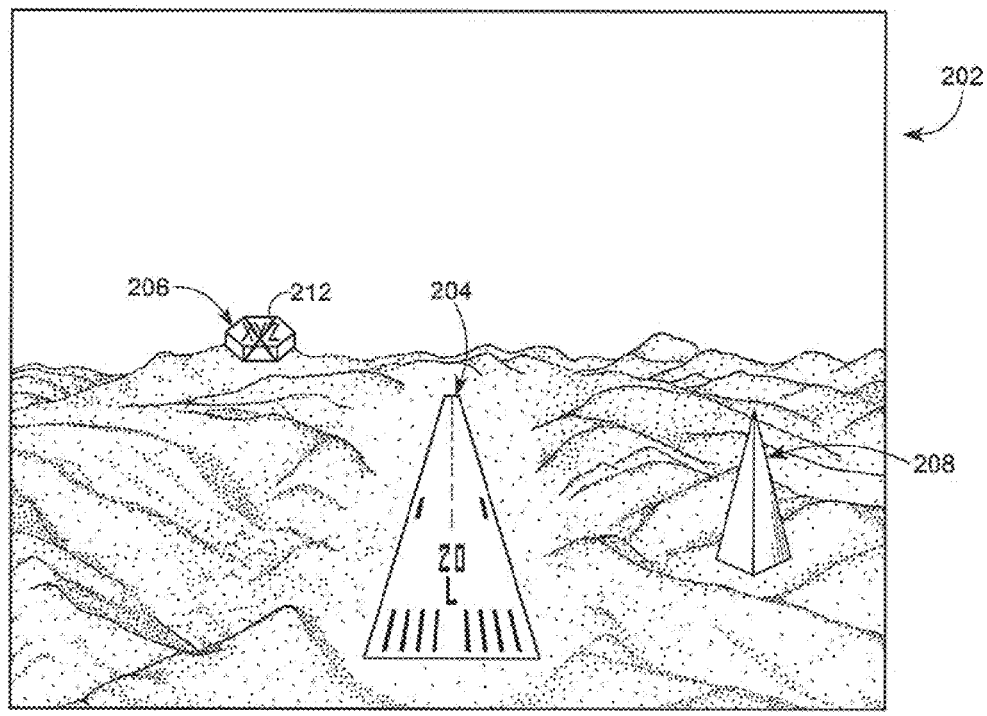

FIG. 4C depicts the same scene as FIG. 4A but includes non-textual NOTAM information of a NOTAM affecting a navigation aid.

Figure 4D:
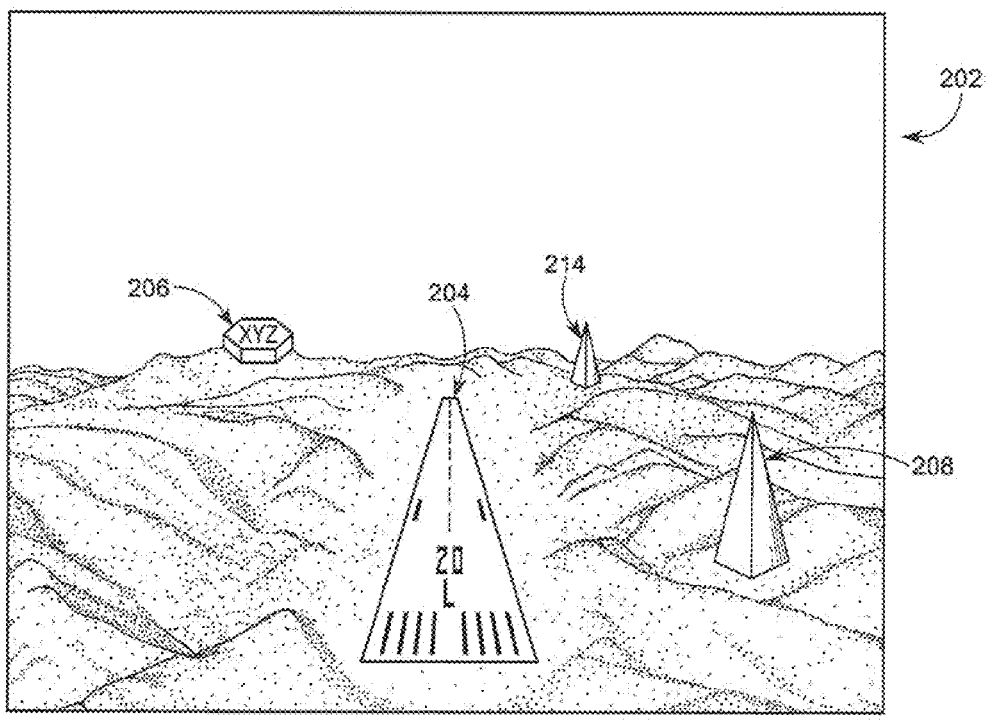

FIG. 4D depicts the same scene as FIG. 4A but includes non-textual NOTAM information of a NOTAM advising of a new obstruction.

Figure 5:
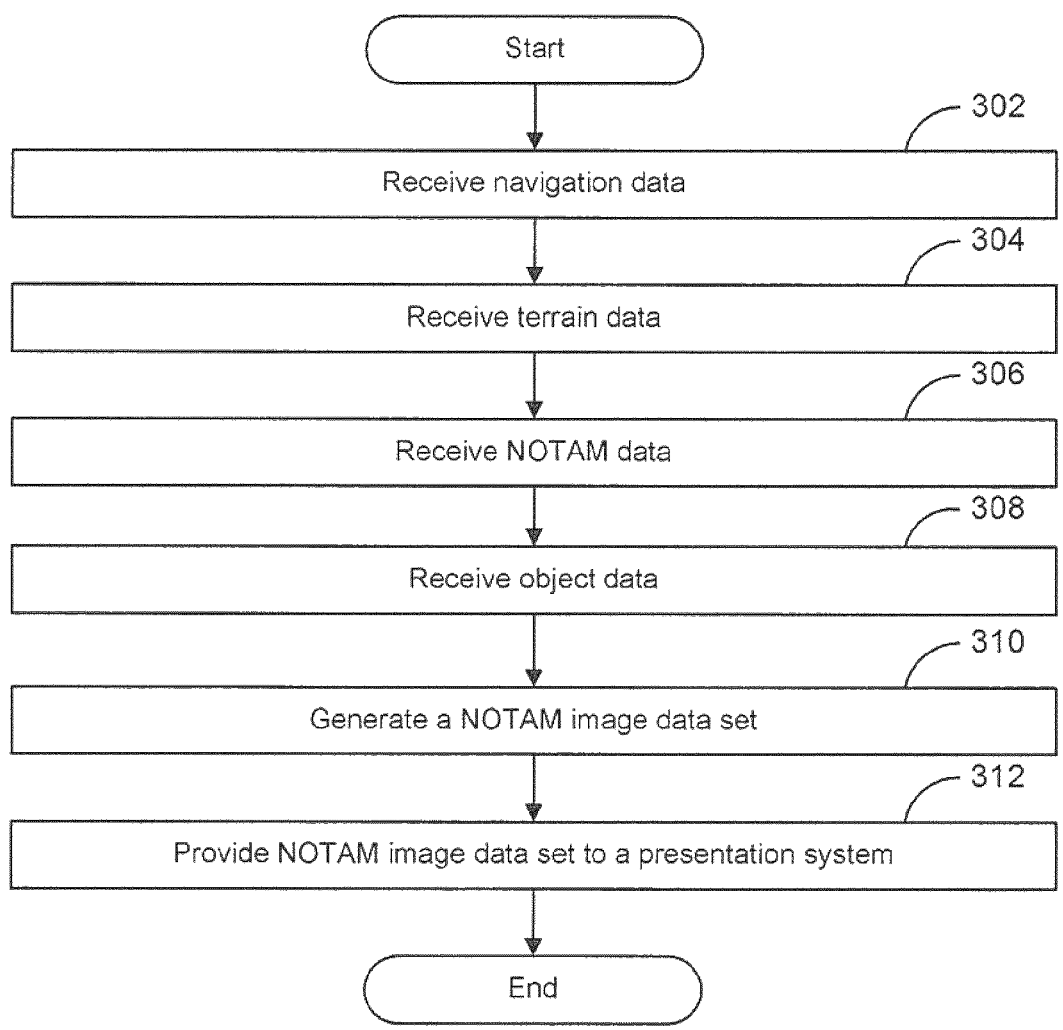

FIG. 5 depicts a flowchart of a method for presenting NOTAM information.

DETAILED DESCRIPTION OF THE INVENTION

In the following description, several specific details are presented to provide a thorough understanding of embodiments of the invention. One skilled in the relevant art will recognize, however, that the invention can be practiced without one or more of the specific details, or in combination with other components, etc. In other instances, well-known implementations or operations are not shown or described in detail to avoid obscuring aspects of various embodiments of the invention.

Figure 1:
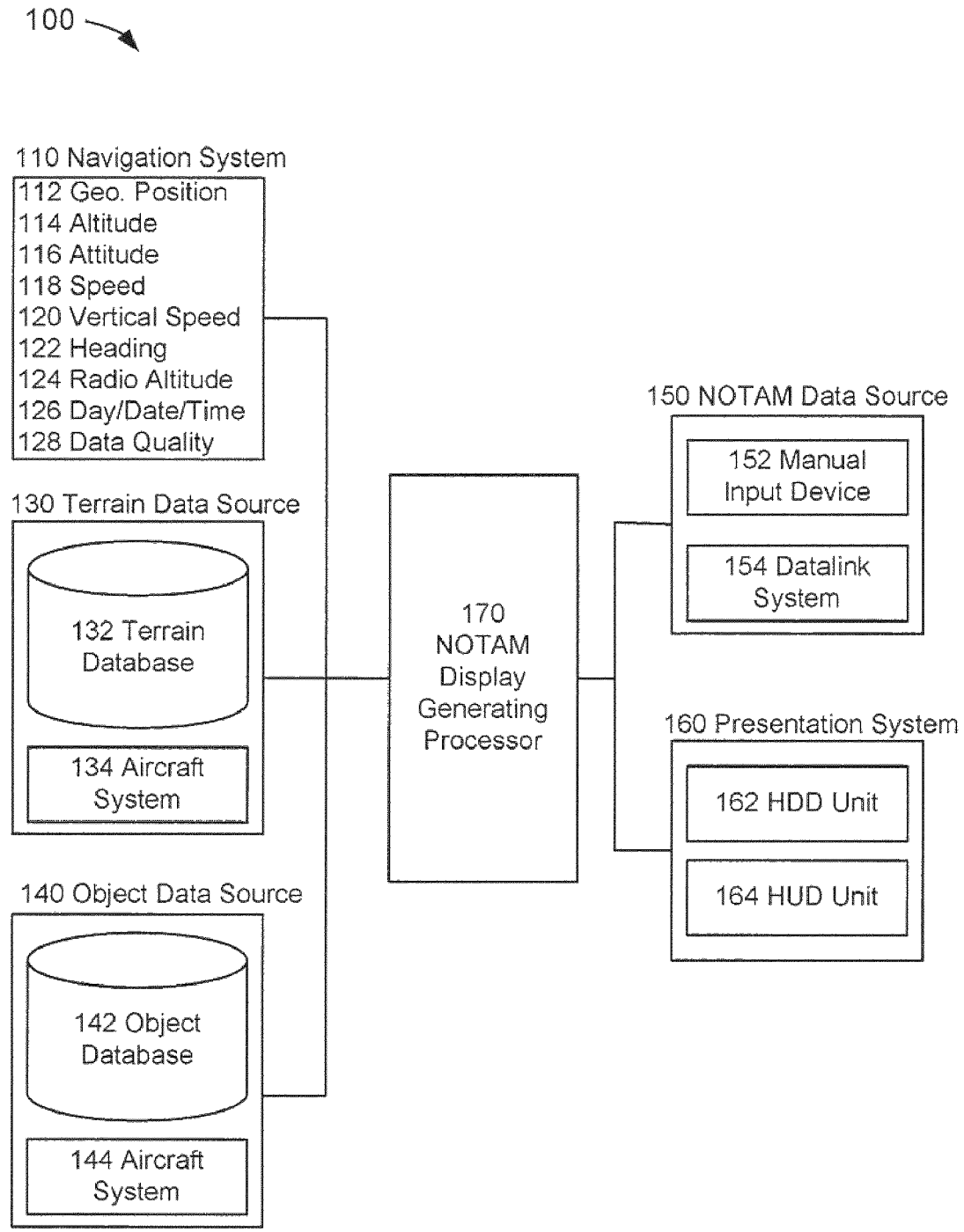
FIG. 1 depicts a block diagram of a NOTAM presentation system.

FIG. 1 depicts a block diagram of a NOTAM presentation system 100 suitable for implementation of the techniques described herein. The system may be comprised of a navigation system 110, a terrain data source 130, an object data source 140, a Notice to Airmen ("NOTAM") data source 150, a presentation system 160, and a NOTAM display generating ("NDG") processor 170.

In an embodiment of FIG. 1, a navigation system 110 comprises the system or systems that could provide navigation data information in an aircraft. It should be noted that data, as embodied herein for any source or system in an aircraft including a navigation system, could be comprised of any analog or digital signal, either discrete or continuous, which could contain information. As embodied herein, data and signals are treated synonymously. Aircraft could mean any vehicle which is able to fly through the air or atmosphere including, but not limited to, lighter than air vehicles and heavier than air vehicles, wherein the latter may include fixed-wing and rotary-wing vehicles. A navigation system 110 may include, but is not limited to, an air/data system, an attitude heading reference system, an inertial guidance system (or inertial reference system), a global navigation satellite system ("GNSS") (or satellite navigation system), and/or a flight management computing system, all of which are known to those skilled in the art. For the purposes of the embodiments herein, a radio altimeter system may be included in the navigation system 110; a radio altimeter system is known to those skilled in the art for determining the altitude above the surface over which the aircraft is currently operating. As embodied herein, a navigation system 110 could be a source for providing navigation data including, but not limited to, geographic position 112, altitude 114, attitude 116, speed 118, vertical speed 120, heading 122, radio altitude 124, day/date/time 126 and data quality 128. As embodied herein, aircraft position comprises geographic position (e.g., latitude and longitude coordinates) and altitude, and direction may be derived from either geographic position, aircraft position, or both. Also, aircraft orientation may include pitch, roll, and/or heading information related to the attitude of the aircraft. As embodied herein, data from a navigation system 110 may be provided to an NDG processor 170 for subsequent processing as discussed herein.

In an embodiment of FIG. 1, a terrain data source 130 may include, but is not limited to, a terrain database 132, other aircraft systems 134, or any combination thereof. A terrain data source 130 could comprise any source of terrain data, obstacle data, other manmade or natural features, geopolitical boundaries, or any combination thereof. Obstacles may include, but are not limited to, towers, buildings, poles, wires, other manmade structures, and foliage. As embodied herein, obstacles and obstructions are treated synonymously.

A terrain database 132 may be any database used to store terrain data contained in digital elevation models ("DEM"). Generally, the terrain data of a DEM is stored as grids composed of cells, and each grid or cell represents an area of terrain. A grid or cell may be of various shapes. For example, a grid or cell may be defined in arc-seconds of latitude and longitude, or may be rectangular, square, hexagonal, or circular. A grid or cell may also be of differing resolutions. For instance, the U.S. Geological Survey developed GTOPO30, a global DEM which may provide 30 arc-seconds (approximately 900 meters) resolution. On the other hand, the Space Shuttle Endeavour in February 2000 acquired elevation data known as Shuttle Radar Topography Mission ("SRTM") terrain elevation data which may provide generally one arc-second (or approximately 30 meters) resolution, providing much greater detail than that provided with the GTOPO30 data set. At the present time, resolutions of one-arc second for SRTM terrain data are available for areas over the United States; for all other locations, resolutions of three arc-seconds (approx. 90 meters) are available. In addition to these public sources of terrain data, there are military and private sources of terrain data. Various vendors and designers of avionics equipment have developed databases that have been, for all intents and purposes, proprietary in nature.

It should be noted that data contained in any database discussed herein including a terrain database 132 and an object database 142 may be stored in a digital memory storage device or computer-readable media including, but not limited to, RAM, ROM, CD, DVD, hard disk drive, diskette, solid-state memory, PCMCIA or PC Card, secure digital cards, and compact flash cards. Data contained in such databases could be loaded while an aircraft is on the ground or in flight. Data contained in such databases could be provided manually or automatically through an aircraft system capable of receiving and/or providing such manual or automated data. Data contained in such databases could be temporary in nature; for example, data representative of a temporary obstacle could be stored in terrain database 132, and a temporary runway closure could be stored in a navigation database of a flight management system ("FMS"). Any database used in the embodiments disclosed herein may be a stand-alone database or a combination of databases. For example, a terrain database 132 may be associated with a terrain awareness and warning system ("TAWS") only. In an alternative embodiment, terrain data could be stored in or combined with an airport database, airspace database, or with a database used by any other aircraft system including, but not limited to, a flight management computing system, or an airspace awareness and warning system ("AAWS"). An example of a TAWS and an AAWS which utilize airport and airspace databases are described in U.S. patent application Ser. Nos. 12/069,234 and 12/069,319, respectively.

Other aircraft systems 134 could employ terrain databases 132, where such systems could also comprise a terrain data source 130. For example, a synthetic vision system ("SVS") may employ a terrain database to generate terrain image data. In another example, an Enhanced Vision System ("EVS") could provide terrain data in the form of terrain image data. In another alternative, a combined SVS and EVS could provide terrain data in the form of terrain image data. As embodied herein, a terrain data source 130 could provide terrain data to an NDG processor 170 for subsequent processing as discussed herein.

In the embodiment of FIG. 1, an object data source 140 could comprise any source of object data for one or more objects such as but not limited to, obstacles, airports, navigation aids, and/or obstructions. An object data source 140 may include, but is not limited to, an object database 142 and other aircraft systems 144. Although depicted separately in FIG. 1, an object data source 140 could include a terrain data source 130. As embodied herein, there could be an overlap of object data between object data sources; that is, object data representative of object information may be stored in more than one object data source 140.

An object database 142 could comprise a navigation database. A navigation database could contain data associated with ground-based navigational aids, waypoints, holding patterns; airways, airports, heliports, instrument departure procedures, instrument arrival procedures, instrument approach procedures, runways, precision approach aids, company routes, airport communications, localizer and airway markers, restricted airspace, airport sector altitudes, enroute airways restrictions, enroute communications, preferred routes, controlled airspace, geographical references, arrival and/or departure flight planning, path point records, and/or GNSS Landing Systems. Such navigation database could be provided by an aircraft system such as, but not limited to, an FMS, a system known to those skilled in the art.

An object database 142 could comprise an airport database which may be considered synonymously with a taxi navigation database such as one described by Krenz et al in U.S. patent application Ser. No. 11/820,950, may be used to store airport data that may be comprised of, in part, airport surfaces and airport visual aids. Airport surfaces include, but are not limited to, locations and information delineating or defining locations of runways, taxiways, and apron areas, fixed based operators ("FBOs"), terminals, and other airport facilities. Airport visual aids include, but are not limited to, airport pavement markings, runway markings, taxiway markings, holding position markings, airport signs, mandatory instruction signs, location signs, direction signs, destination signs, information signs, and runway distance remaining signs.

An object database 142 could comprise an airspace database that may be used to store airspace-related data including, but not limited to, information related to regulatory special use airspace area and non-regulatory special use airspace area data. Regulatory special use airspace data may be comprised of, in part, prohibited areas and restricted areas. Non-regulatory special use airspace data may be comprised of, in part, military operations areas, alert areas, warning areas, and national security areas. Prohibited areas contain airspace of defined dimensions identified by an area within which the flight of aircraft is prohibited. Such areas may be established for safety, security, national defense, national welfare, or other reasons. Restricted areas contain airspace within which the flight of aircraft, while not wholly prohibited, is subject to restrictions. Restricted areas may denote the existence of unusual, often invisible, hazards to aircraft such as artillery firing, aerial gunnery, or guided missiles. Penetration of restricted areas without authorization from a using or controlling agency may be extremely hazardous to the aircraft and its occupants.

Generally, airspaces are depicted on aeronautical charts or discussed in other operational publications which provide aeronautical information. An airspace may be delineated by vertical and/or horizontal dimensions. The vertical dimensions of airspace may be designated by altitude floors and ceilings expressed as flight levels or other appropriate measures such as feet or meters above mean sea level (MSL) or other reference including the surface of the earth. The horizontal dimensions of an airspace may be defined by geographic coordinates or other appropriate references that clearly define its perimeter. An airspace may be in effect for one or more designated time periods or run continuously. Additional information regarding airspaces is disclosed in U.S. patent application Ser. No. 12/069,319.

Other aircraft systems 144 could employ an object database 142, where such systems could comprise an object data source 140. For example, other aircraft systems 144 could include, but are not limited to, a flight management system, a TAWS, and an AAWS. As embodied herein, an object data source 140 could provide object data to an NDG processor 170 for subsequent processing as discussed herein.

In an embodiment of FIG. 1, a NOTAM data source 150 may include, but is not limited to, a manual input device 152 and/or datalink system 154. A manual input device may include any device which enables a person to enter NOTAM information. A datalink system 154 could include those systems that receive NOTAM data from sources external to the aircraft including, but not limited to, ground stations and satellites.

A NOTAM may be a notice containing information concerning the establishment, condition, or change in any aeronautical facility, service, procedure or hazard, the timely knowledge of which is essential to personnel concerned with such operations. NOTAMs may be issued and/or reported by national authorities for a number of reasons, such as: hazards such as airshows, parachute jumps, and glider or micro light flying; flights by important people such as heads of state; closed runways, taxiways, etc.; unserviceable radio navigational aids; military exercises with resulting airspace restrictions; unserviceable lights on tall obstructions; and temporary erection of obstacles near airfields (e.g., cranes).

In the United States, the procedures for obtaining, formatting, and disseminating NOTAMs have been published by the United States Federal Aviation Administration ("FAA") and may be found currently in FAA Order JO 7930.2M entitled "Notices to Airmen (NOTAM)." The FAA has published a format for NOTAMs that could contain the following fields: an ADP code field, an accountability location field, an affected location field, a keyword field, a surface identification field, a condition field, and a time field. In a first field, an ADP code may be an exclamation point. In a second field, an accountability location may be the identifier of the location in the NOTAM system which tracks NOTAM numbering. In a third field, an affected location may be an identifier of the affected location.

In a fourth field, one of a plurality of keywords may be used including, but not limited to, AD, AIRSPACE, APRON, COM, NAV, OBST, RAMP, RWY, SVC, and TWY. Each of these keywords and the meaning thereof are discussed in FAA Order JO 7930.2M. Although the embodiments herein may include any keywords used in a NOTAM field, examples will be drawn to the use of three keywords—RWY, NAV, and OBST—to provide only three exemplary illustrations and not limitations of how data representative of NOTAM information affecting a runway, navigation aid, and obstruction, respectively, may be presented non-textually and/or textually to a pilot on a display unit.

The keyword RWY (runway) may apply to landing and take-off surfaces, and associated lighting and signage. RWY may be followed by the magnetic bearing indicator (e.g., RWY 12/20, RWY 12, or RWY 30), or if a magnetic bearing indicator has not been assigned, RWY may be followed by the nearest compass point (e.g., RWY NE/SW). The keyword NAV may apply to status of a navigation aid. The keyword OBST may apply to obstructions including, but not limited to, obstruction lighting outages, moored balloons, kites, towers, cranes, and smoke stacks. As embodied herein, the terms obstruction and obstacle may be treated synonymously.

In a fifth field, an optional surface identification may be used to identify a runway when the keyword RWY is used, a taxiway when the keyword TWY is used, and a ramp/apron when the keywords RAMP or APRON are used. When the keyword NAV is used, this field may be used to identify the type or category of navigation aid. When the keyword OBST is used, this field may be used to identify the type or category of obstruction. In a sixth field, the condition may be reported. In a seventh field, one or more effective times may be reported.

The drawings of FIG. 2 illustrate possibilities of how a NOTAM may be formatted in a sequence of fields. In the example shown in FIG. 2A, the NOTAM shown is translated as follows: "Runway Two Right/Two Zero Left ("RWY 2R/20L") closed effective Aug. 17, 2009, at 1300 hours Universal Coordinated Time until Aug. 23, 2009, 1700 hours."

As illustrated in FIG. 2A, a NOTAM may be comprised of the following fields to convey information about a runway at an airport identified as ABC: an ADP code field may contain an exclamation point; the accountability location field may contain the identifier "ABC"; the affected location field may contain the identifier "ABC"; the keyword field may contain "RWY"; the surface identification field may contain "2R/20L"; the condition field may contain "CLSD"; and the time field could contain "WEF 0908171300-0908231700." As embodied herein, the affected object of the NOTAM may be considered as ABC RWY 2R/20L.

In the example shown in FIG. 2B, the NOTAM shown is translated as follows: "XYZ VOR is expected to go out of service at 1600 on Aug. 17, 2009, and remain out until further notice."

As illustrated in FIG. 2B, a NOTAM could be comprised of the following fields to convey information about a navigation aid identified as XYZ: the ADP code field may contain an exclamation point; the accountability location field may contain the identifier "ABC"; the affected location field may contain the identifier "XYZ"; the keyword field may contain "NAV" for navigation aid. Because the keyword NAV is used, the optional surface identification field may be used to identify the type or category of navigation aid which, in this example, is a "VOR." The condition field may contain "OTS"; and the time field could contain "WEF 0908171600." As embodied herein, the affected object of the NOTAM may be considered as XYZ VOR.

In the example shown in FIG. 2C, the NOTAM shown is translated as follows: "a crane having a height of 125 feet above ground level is located 0.75 nautical miles southwest of ABC until 2000 on Aug. 23, 2009."

As illustrated in FIG. 2C, a NOTAM could be comprised of the following fields to convey information about an obstruction near an airport identified as ABC: the ADP code field may contain an exclamation point; the accountability location field may contain the identifier "ABC"; the affected location field may contain the identifier "ABC"; the keyword field may contain "OBST." Because the keyword OBST is used, the optional surface identification field may be used to identify the type of obstruction which, in this example, is a crane. The condition field may contain "195 (125 AGL) .75 SW"; and the time field could contain "WEF 0908232000." As embodied herein, the affected object of the NOTAM may be considered as the crane, obstruction, and/or obstacle at the stated location.

Although the preceding examples have been drawn to the formatting requirements published by the FAA, the embodiments are not limited by these requirements. In addition to the FAA, the International Civil Aviation Organization ("ICAO") has published procedures for obtaining, formatting, and disseminating NOTAMs which may be found in the current edition of Annex 15 of the publication entitled "Aeronautical Information Services." Although the formatting requirements adopted by the ICAO differ from those adopted by the FAA, the embodiments herein could include any defined format adopted for the processing of NOTAMs including, but not limited to, those adopted by the FAA and ICAO. Those skilled in the art will appreciate the ability and ease with which executable software code may be reprogrammed or modified by a manufacturer or end-user to facilitate a configuration capable of accepting one or more formats without affecting or expanding the scope of the embodiments discussed herein. As embodied herein, the object of a NOTAM may be the equivalent to the combination of an identifier, keyword, and specific object associated with the keyword of an FAA NOTAM.

Returning to FIG. 1, presentation system 160 could include any unit that presents symbology of tactical flight information including, but not limited to, a Head-Down Display ("HDD") unit 162 and/or a Head-Up Display ("HUD") unit 164. An HDD unit 162 may present tactical information to the pilot or flight crew—information relevant to the instant or immediate control of the aircraft, whether the aircraft is in flight or on the ground. An HDD unit 162 is typically a unit mounted to an aircraft's flight instrument panel located in front of a pilot and below the windshield and the pilot's field of vision.

An HDD unit 162 displays the same information found on a primary flight display ("PFD"), such as "basic T" information (i.e., airspeed, attitude, altitude, and heading). Although it provides the same information as that of a PFD, an HDD unit 162 may also display a plurality of indications or information including, but not limited to, selected magnetic heading, actual magnetic track, selected airspeeds, selected altitudes, altitude barometric correction setting, vertical speed displays, flight path angle and drift angles, flight director commands, limiting and operational speeds, mach number, radio altitude and decision height, final approach trajectory deviations, and marker indications. An HDD unit 162 is designed to provide flexible configurations which may be tailored to the desired configuration specified by a buyer or user of the aircraft.

FIG. 3A provides an exemplary depiction of an HDD unit for presenting tactical information to the pilot or flight crew against the background of a three-dimensional image of terrain and sky; an HDD unit could be employed as a display unit in an SVS, an EVS, and/or a combined SVS-EVS. It should be noted that the tactical information or symbology depicted on the HDD unit has been made minimal for the sake of presentation and is not indicative of the plurality of indications or information with which it may be configured.

Returning to FIG. 1, HUD unit 164 may provide tactical information to the pilot or flight crew, in the pilot's forward field of view through the windshield, eliminating transitions between head-down to head-up flying. Similar to an HDD unit 162, a HUD unit 164 may be tailored to the desired configuration specified by a buyer or user of the aircraft. As embodied herein, an HDD unit 162, a HUD unit 164, or both could receive an image data set from an NDG processor 170 for subsequent presentation.

FIG. 3B provides an exemplary depiction of a HUD unit for presenting tactical information to the pilot or flight crew against the background of a three-dimensional image of terrain and sky; a HUD unit could be employed as a display unit in an SVS, an EVS, or combined SVS-EVS. It should be noted that the tactical information or symbology depicted on the HUD unit has been made minimal for the sake of presentation and is not indicative of the plurality of indications or information with which it may be configured. Because the indications or information shown in the drawings of FIGS. 3A and 3B are well-Returning to FIG. 1, an NDG processor 170 may be any electronic data processing unit which executes software or source code stored, permanently or temporarily, in a digital memory storage device or computer-readable media (not depicted herein) including, but not limited to, RAM, ROM, CD, DVD, hard disk drive, diskette, solid-state memory, PCMCIA or PC Card, secure digital cards, and compact flash cards. An NDG processor 170 may be driven by the execution of software or source code containing algorithms developed for the specific functions embodied herein. Common examples of electronic data processing units are microprocessors, Digital Signal Processors (DSPs), Programmable Logic Devices (PLDs), Programmable Gate Arrays (PGAs), and signal generators; however, for the embodiments herein, the term processor is not limited to such processing units and its meaning is not intended to be construed narrowly. For instance, a processor could also consist of more than one electronic data processing unit. As embodied herein, an NDG processor 170 could be a processor(s) used by or in conjunction with any other system of the aircraft including, but not limited to, a processor(s) associated with a navigation system 110, an FMS, and/or presentation system 160 which could include a vision system such as, but not limited to, an SVS, an EVS, and/or a combined SVS-EVS.

An NDG processor 170 may be programmed or configured to receive as input data representative of information obtained from various systems and/or sources including, but not limited to, a navigation system 110, a terrain data source 130, an object data source 140, and/or a NOTAM data source 150. As embodied herein, the terms "programmed" and "configured" are synonymous. An NDG processor 170 may be electronically coupled to systems and/or sources to facilitate the receipt of input data; as embodied herein, operatively coupled may be considered as interchangeable with electronically coupled. An NDG processor 170 may be programmed or configured to execute the methods discussed in detail below. An NDG processor 170 may be programmed or configured to provide output data to various systems and/or units including, but not limited to, a presentation system 160. An NDG processor 170 may be electronically coupled to systems and/or units to facilitate the providing of output data. It is not necessary that a direct connection be made; instead, such receipt of input data and the providing of output data could be provided through a data bus or through a wireless network.

In the embodiment of FIG. 1, an NDG processor 170 may generate a NOTAM image data set as a function of navigation data provided by a navigation system 110, terrain data provided from a terrain data source 130, object data provided from an object data source 140, and/or NOTAM data provided from a NOTAM data source 150. After receiving NOTAM data, an NDG processor 170 could determine an affected object of the NOTAM from one or more fields as discussed above. A condition field could determine the presentation of NOTAM information on a display unit as discussed in detail below. An NDG processor 170 could determine placement of non-textual and/or textual NOTAM information by determining the position where such information would appear on the screen of a display unit; for example, where the determination of such position could include a scaling component to convert "world space" to "screen space." Then, the NOTAM data may be combined with the terrain data and object data to generate a NOTAM image data set that will be provided to an HDD unit 162, a HUD unit 164, or both for subsequent presentation to a pilot or flight crew.

The advantages and benefits of the embodiments discussed herein may be illustrated by showing examples of how the situational awareness of NOTAMs could be enhanced with a NOTAM presentation system 100 by graphically presenting NOTAM information to a pilot or flight crew member on an aircraft, display unit. The drawings of FIG. 4 provide three exemplary depictions of how NOTAM information may be graphically displayed on an aircraft display unit.

The drawings of FIG. 4 provide a depiction of a three-dimensional perspective scene outside the aircraft on a HDD unit 202 where such scene contains three objects without the depiction of NOTAM information: a runway 204, a navigation aid 206, and an obstacle 208. In the drawings, runway 204 has been designated as "Runway 20L," and navigation aid 206 has been designated as "XYZ VOR." For the purpose of illustrating exemplary embodiments of the disclosures herein, the NOTAMs of the FIGS. 2A through 2C may be presented to a pilot as shown in the drawings of FIGS. 4B through 4D, respectively. It should be noted that tactical information or symbology presented in FIG. 3A has been removed for the sake of presentation and not for the sake of limitation. Although the following discussing will be drawn to an HDD unit 162, the embodiments herein are not limited but may include other display units including, but not limited to, a HUD unit 164.

FIG. 4B provides an exemplary illustration of HDD unit 202 with the NOTAM information of FIG. 2A depicted against the background of a three-dimensional perspective scene outside the aircraft, where the object of the NOTAM may be runway 204. As stated above, an affected location field may contain the identifier "ABC," and a keyword field may contain "RWY," and the surface identification field may contain "2R/20L." Given these fields, NDG processor 170 could retrieve runway information corresponding to ABC Runway 2R/20L from an object data source 140 such as, but not limited to, a navigation database and/or taxi navigation database. Because the condition field contains "CLSD," NDG processor 170 may generate runway closure markings in its generation of a NOTAM image data set. Because an effective times field is provided, NDG processor 170 may generate such markings during the effective time using a day/date/time input 126.

As shown in FIG. 4B, NOTAM information may be presented as non-textual information such as, but not limited to, the depiction of applicable symbology and/or altering the appearance and/or color of the surface, either in whole or in part, from the usual depiction when the runway is open; for example, altering the appearance could comprise changing the pattern, shape, and/or size of the surface. In FIG. 4B, thee "X"s 210-A, 210-B, and 210-C have been placed on top of the runway to signify a temporarily closed runway, where the "X" could be any color such as, but not limited to, yellow; moreover, the appearance of the text may be altered.

Although not included in FIG. 4B, NOTAM information may be presented as textual information such as, but not limited to, the depiction of the text "NOTAM: ABC RWY 2R/20L CLOSED" across the top of HDD unit 202 and/or the text "CLSD" adjacent to runway 204. As embodied herein, NOTAM information for any NOTAM could be depicted as non-textual information, textual information, or both.

As embodied herein, the size, color, and/or placement of any NOTAM information related to airport surfaces depicted on an aircraft display unit could correspond to size, color, and/or placement standards adopted by aviation governing authorities, where such depiction could be proportionately scaled to replicate the size, color, and/or placement of actual surface marking(s) as determined by such standards. Those skilled in the art are aware that aviation governing authorities may have developed standards for temporary and/or permanent surface markings. For example, standards applicable to temporary and/or permanent surface markings have been published by the United States Federal Aviation Administration ("FAA") and may be found in Advisory Circular AC150/5340-1J, an FAA Advisory Circular entitled "Standards for Airport Markings" and dated Apr. 29, 2005. As disclosed by Chiew et al in U.S. patent application Ser. No. 12/217,458 dated Jul. 3, 2008, the markings of a runway surface graphically depicted on an aircraft display unit could correspond to a category of runway assigned to it by the aviation governing authority. Similarly, the size, color, and/or placement of any graphically depicted NOTAM information related to airport surfaces could correspond to an assigned category of the surface.

It should be noted that although the preceding discussion has been drawn to an FAA standard for the purpose of simplifying the discussion only; the embodiments are neither limited nor restricted to airports of the United States or those with governing oversight of the FAA. It is known to those skilled in the art that aviation governing authorities throughout the world may have developed standards unique to their respective jurisdictions which may or may not employ a similar marking scheme. The embodiments disclosed herein could include all airport and airport surface markings standards or schemes that could be developed or employed.

FIG. 4C provides an exemplary illustration of HDD unit 202 with the NOTAM information of FIG. 2B depicted against the background of a three-dimensional perspective scene outside the aircraft, where the object of the NOTAM may be navigation aid 206. As stated above, an affected location field may contain the identifier "XYZ," and a keyword field may contain "NAV," and the surface identification field may contain the type of navigation aid "VOR" because the keyword field is "NAV." Given these fields, NDG processor 170 could retrieve navigation aid information corresponding to the XYZ VOR from an object data source 140 such as, but not limited to, a navigation database. Because the condition field contains "OTS," NDG processor 170 may include data representative of a closure marking in its generation of a NOTAM image data set. Because an effective time field is provided, NDG processor 170 may generate such marking during the effective time using a day/date/time input 126.

As shown in FIG. 4C, NOTAM information may be presented as non-textual information such as, but not limited to, altering the appearance and/or color of the navigation aid, either in whole or in part, from the usual depiction when the navigation aid is in service; for example, altering the appearance could comprise changing the pattern, shape, and/or size of the navigation aid. In FIG. 4C, an "X" 212 has been placed over the navigation aid 206 to indicate to a pilot that the XYZ VOR station is out of service, where such "X" could also be depicted in any color such as, but not limited to, yellow or red. Although not included in FIG. 4C, NOTAM information may be presented as textual information such as, but not limited to, the depiction of the text "NOTAM: XYZ VOR OTS" across the top of HDD unit 202 and/or the text "OTS" adjacent to navigation aid 206; moreover, the appearance of the text may be altered.

It is known to those skilled in the art that a navigation aid may be used in defining navigation fixes and/or waypoints. If navigation fixes and/or waypoints are depicted on a display unit and are defined by a NOTAM-affected navigation aid, non-textual and/or textual depictions of NOTAM information may be presented for each depicted fix and/or waypoint defined by the affected navigation aid.

FIG. 4D provides an exemplary illustration of HDD unit 202 with the NOTAM information of FIG. 2C depicted against the background of a three-dimensional perspective scene outside the aircraft, where the object of the NOTAM may be obstruction 214. As stated above, an affected location field may contain the identifier "ABC," and a keyword field may contain "OBST," and the surface identification field may contain the type of obstruction "CRANE" because the keyword field is "OBST." Given these fields, NDG processor 170 could attempt to retrieve obstacle information corresponding to the crane extending 125 feet above ground level at the stated location near ABC from an object data source such as, but not limited to, a terrain data source 130 that includes obstacle or obstruction information.

For the purpose of this example, it will be assumed that no data exists in an object data source 140 for the identified obstruction. Because the location of the obstruction is referenced to ABC, NDG processor 170 could retrieve reference information of ABC from an object data source 140 such as, but not limited to, a navigation data source and include data representative of the obstruction in the processor's generation of a NOTAM image data set. Because an effective time field is provided, NDG processor 170 may generate such obstruction during the effective time using a day/date/time input 126.

As shown in FIG. 4D, NOTAM information may be presented as non-textual information such as, but not limited to, a depiction of an obstruction 214, where the appearance and/or color of such obstacle could be altered from the usual depiction of an obstruction; for example, altering the appearance could comprise changing the pattern, shape, and/or size of the obstruction. Although not included in FIG. 4D, NOTAM information may be presented as textual information such as, but not limited to, the depiction of the text "NOTAM: ABC OBST CRANE 195 (125 AGL) .75 SW" across the top of HDD unit 202 and/or the text "CRANE" adjacent to obstacle 214; moreover, the appearance of the text may be altered.

FIG. 5 depicts a flowchart 300 of an example of a method for presenting NOTAM information. The flowchart begins with module 302 with the receiving of navigation data including data representative of the aircraft position and attitude. The navigation data could be received by an NDG processor 170 from a navigation system 110, and position could comprise of geographic position (e.g., latitude and longitude coordinates) and altitude. As embodied herein, the receiving of data by a processor or the providing of data to a processor may include an inherent step in which the processor performs a retrieval operation of such data.

The flowchart continues with module 304 with the receiving of terrain data. Terrain data may be received by an NDG processor 170 from a terrain data source 130. In one embodiment, terrain data could be provided by a terrain database 132. As embodied herein, navigation data could be used in determining terrain data. In another embodiment, terrain data could comprise terrain image data provided by other aircraft systems or components thereof including, but not limited to, an SVS, an EVS, and/or a TAWS.

The flowchart continues with module 306 with the receiving of NOTAM data representative of one or more NOTAMs. NOTAM data may be received by an NDG processor 170 from a NOTAM data source 150. In one embodiment, NOTAM data could be provided by a manual input device 152. In another embodiment, NOTAM data could be provided by a datalink system 154.

The flowchart continues with module 308 with the receiving of object data. Object data may be received by an NDG processor 170 from an object data source 140. In one embodiment, object data may be based upon the object information contained in one or more fields of the NOTAM data. In one embodiment, an object data source could comprise a plurality of data sources including, but not limited to, an airport database; a navigation database; an airspace database; a terrain data source 130; a NOTAM data source 150, and other aircraft systems including, but not limited to, a flight management system and an AAWS. As embodied herein, a source from which object data is provided could depend on the type of object (e.g., runway, navigation aid, obstruction, etc.) as specified in one or more fields in the NOTAM data. In another embodiment, NOTAM data may be formatted with one or more fields containing object data.

The flowchart continues with module 310 with the generating of a NOTAM image data set. The NOTAM image data set may be generated by an NDG processor 170 as a function of navigation data, terrain data, NOTAM data, and object data. The NOTAM image data set could be representative of NOTAM information presented in a three-dimensional perspective of a scene outside the aircraft. In one embodiment, the NOTAM information could be comprised of non-textual NOTAM information, textual NOTAM information, or both. In another embodiment, the non-textual information could be depicted with symbology applicable to the NOTAM data, where such symbology could correspond to size, color, and/or placement standards adopted by aviation governing authorities. In another embodiment, the appearance and/or color of non-textual information and/or textual information could be altered.

The flowchart continues with module 312 with the providing of the NOTAM image data set to a presentation system. The NOTAM image data set may be provided by an NDG processor 170. When received, a display unit such as an HDD unit 162 and/or HUD unit 164 may present the image represented in the NOTAM image data set, such that NOTAM information of at least one object appearing in the scene outside the aircraft may be presented. Then, the flowchart proceeds to the end.

It should be noted that the method steps described above may be embodied in computer-readable media as computer instruction code. It shall be appreciated to those skilled in the art that not all method steps described must be performed, nor must they be performed in the order stated.

As used herein, the term "embodiment" means an embodiment that serves to illustrate by way of example but not limitation.

It will be appreciated to those skilled in the art that the preceding examples and embodiments are exemplary and not limiting to the scope of the present invention. It is intended that all modifications, permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations, enhancements, and equivalents as falling within the true spirit and scope of the present invention.

What is claimed is:

1. A system for presenting NOTAM information on a display unit, such system comprising:
    a source for providing navigation data;
    a source for providing terrain data;
    a source for providing NOTAM data;
    a source for providing object data;
    a NOTAM display generating processor, wherein such processor
        receives navigation data representative of aircraft position and attitude,
        receives terrain data,
        receives NOTAM data,
        receives object data,
        generates a NOTAM image data set as a function of the navigation data, terrain data, NOTAM data, and object data, where the NOTAM image data set is representative of NOTAM information presented in a three-dimensional perspective of a scene outside the aircraft, and
        provides the NOTAM image data set to a presentation system; and
    the presentation system, where such system
        receives the NOTAM image data set, and
        presents the image represented in the image data set on at least one display unit, whereby the NOTAM information of at least one object is presented.

2. The system of claim 1, wherein the object data source comprises a terrain data source, a NOTAM data source, or both.

3. The system of claim 1, wherein the NOTAM data source comprises a manual input device, a datalink system, or both.

4. The system of claim 1, wherein the terrain data comprises terrain image data received from at least one of the following vision systems: a synthetic vision system, enhanced vision system, and a combined synthetic-enhanced vision system.

5. The system of claim 1, wherein the object data is contained in the NOTAM data, is based upon the NOTAM data, or both.

6. The system of claim 1, wherein the NOTAM information is comprised of textual NOTAM information, non-textual NOTAM information, or both.

7. The system of claim 6, wherein the non-textual NOTAM information is depicted with symbology applicable to the NOTAM data.

8. The system of claim 6, wherein the textual NOTAM information, non-textual NOTAM information, or both is altered in appearance, color, or both.

9. A module for presenting NOTAM information on a display unit, such module comprising:
    an input communications interface to facilitate the receiving of data by a processor from at least one data source;
    a NOTAM display generating processor, wherein such processor
        receives navigation data representative of aircraft position and attitude from a navigation data source,
        receives terrain data,
        receives NOTAM data,
        receives object data based upon the NOTAM data from an object data source,
        generates a NOTAM image data set as a function of the navigation data, terrain data, NOTAM data, and object data, where the image data set is representative of NOTAM information presented in a three-dimensional perspective of a scene outside the aircraft, and
        provides the NOTAM image data set to a presentation system, whereby the NOTAM information of at least one object is presented on at least one display unit; and
    an output communications interface to facilitate the providing of the NOTAM image data set to the display unit.

10. The module of claim 9, wherein the object data source comprises a terrain data source, a NOTAM data source, or both.

11. The module of claim 9, wherein the NOTAM data source comprises a manual input device, a datalink system, or both.

12. The module of claim 9, wherein the terrain data comprises terrain image data received from at least one of the following vision systems: a synthetic vision system, enhanced vision system, and a combined synthetic-enhanced vision system.

13. The module of claim 9, wherein the object data is contained in the NOTAM data, is based upon the NOTAM data, or both.

14. The module of claim 9, wherein the NOTAM information is comprised of textual NOTAM information, non-textual NOTAM information, or both.

15. The module of claim 14, wherein the non-textual NOTAM information is depicted with symbology applicable to the NOTAM data.

16. The module of claim 14, wherein the textual NOTAM information, non-textual NOTAM information, or both is altered in appearance, color, or both.

17. A method for presenting NOTAM information on a display unit, such method comprising:
   receiving navigation data representative of aircraft position and attitude from a navigation data source;
   receiving terrain data,
   receiving NOTAM data from a NOTAM data source;
   receiving object data based upon the NOTAM data from an object data source;
   generating a NOTAM image data set as a function of the navigation data, terrain data, NOTAM data, and object data, where the image data set is representative of NOTAM information presented in a three-dimensional perspective of a scene outside the aircraft; and
   providing the NOTAM image data set to a presentation system, whereby the NOTAM information of at least one object is presented on at least one display unit.

18. The method of claim 17, wherein the object data source comprises a terrain data source, a NOTAM data source, or both.

19. The method of claim 17, wherein the NOTAM data source comprises a manual input device, a datalink system, or both.

20. The method of claim 17, wherein the terrain data comprises terrain image data received from at least one of the following vision systems: a synthetic vision system, enhanced vision system, and a combined synthetic-enhanced vision system.

21. The method of claim 17, wherein the object data is contained in the NOTAM data, is based upon the NOTAM data, or both.

22. The method of claim 17, wherein the NOTAM information is comprised of textual NOTAM information, non-textual NOTAM information, or both.

23. The method of claim 22, wherein the non-textual NOTAM information is depicted with symbology applicable to the NOTAM data.

24. The method of claim 22, wherein the textual NOTAM information, non-textual NOTAM information, or both is altered in appearance, color, or both.

* * * * *